United States Patent [19]

Ueno et al.

[11] Patent Number: 5,286,219
[45] Date of Patent: Feb. 15, 1994

[54] CUTTER-LESS ROTARY CONNECTOR

[75] Inventors: Seiichi Ueno; Tetsuya Okada, both of Tokyo, Japan

[73] Assignee: The Furukawa Electric Co., Ltd., Tokyo, Japan

[21] Appl. No.: 975,595

[22] Filed: Nov. 12, 1992

[30] Foreign Application Priority Data

Nov. 15, 1991 [JP] Japan .................. 3-93904[U]

[51] Int. Cl.$^5$ ............................ H01R 39/02
[52] U.S. Cl. ............................ 439/475; 439/15; 439/164
[58] Field of Search .................. 439/15, 164, 475; 74/388 PS, 556, 557, 500.5, 504, 502.5, 502.6; 180/255, 257, 259

[56] References Cited

U.S. PATENT DOCUMENTS

| | | | |
|---|---|---|---|
| 2,217,496 | 10/1940 | Riley | 439/475 X |
| 4,390,193 | 6/1983 | Strahan et al. | 74/552 X |
| 4,522,458 | 6/1985 | Werth et al. | 439/475 X |
| 4,750,380 | 6/1988 | Hoblingre et al. | 74/556 |
| 4,824,396 | 4/1989 | Sasaki et al. | 439/475 |
| 4,863,397 | 9/1989 | Hatch, Jr. | 439/475 |
| 4,881,423 | 11/1989 | Troiano | 74/500.5 X |
| 4,975,063 | 12/1990 | Ida et al. | 439/164 X |

FOREIGN PATENT DOCUMENTS 221406  8/1942  Switzerland .................. 74/504

Primary Examiner—Peter Dungba Vo
Attorney, Agent, or Firm—Frishauf, Holtz, Goodman & Woodward

[57] ABSTRACT

A rotary connector includes a stationary case fixed to a stationary member, a rotating case combined with the stationary case for rotation relative to the stationary case, and the rotating case having a torque transmission section for transmitting a torque from a rotating member and a junction to be connected to an external wire. A flexible flat cable having a plurality of electrical conductors coated for insulation is housed, in the form of a spiral capable of tightening and loosening, in an annular space defined by the two cases, one end of the flat cable being connected at the junction to the external wire. The torque transmission section and the junction are fractured and removed from the rotating case under first and second torques, respectively, transmitted from the rotating member.

20 Claims, 9 Drawing Sheets

CUTTER-LESS ROTARY CONNECTOR

BACKGROUND OF THE INVENTION

1. Field of the Invention

The present invention relates to a rotary connector for connecting two relatively rotating members.

2. Description of the Related Art

In a rotary connector for connecting relatively rotating members, e.g., a rotary connector used in a steering apparatus of an automobile, a flat cable is used in order to improve the reliability of electrical connection with the vehicle-body side. This flat cable is a flexible belt-shaped cable which is formed by coating a plurality of flat square conductors for insulation. The flat cable is housed in the form of a spiral in an annular space defined by a rotating case and a stationary case.

The rotary connector, containing the flat cable therein, transmits the rotatory force of a steering shaft, which is produced by turning a steering wheel, to the rotating case through a torque transmission section which comprises a key or pin on the connector. Thus, the rotary connector is designed so that the rotation of the steering wheel is absorbed by a tightening or loosening action of the flat cable as the rotating case rotates, whereby electrical connection with external equipment can be established.

In the rotary connector constructed in this manner, the allowable range of rotation of the rotating case with respect to the stationary case depends on the length of the flat cable. That is, the rotational range is limited.

In mounting the rotary connector in a vehicle, therefore, it is necessary to adjust the steering wheel to a straight-advance position and to orient the rotary connector to a neutral position of the tightening or loosening of the flat cable with respect to horizontal rotation. Thus, the rotary connector must be mounted in the vehicle in a manner such that the flat cable can tighten or loosen within the allowable range of rotation even when the steering wheel is turned to its structural motion limit.

If the rotary connector is mounted in the vehicle without fulfilling these requirements, the flat cable tightens to its limit in the middle of the steering wheel operation, thereby hindering smooth rotation of the steering wheel.

Accordingly, the conventional rotary connector is separately provided with a cutting device in the form of a cutting edge, as a measure to counter the above situation, such that the cutting device cuts the flat cable to eliminate the hindrance to the rotation of the steering wheel.

Each flat cable has its own strength depending on the specifications, including the number and sectional area of conductors which vary according to the application of the rotary connector. According to the method in which the hindrance to the rotation of the steering wheel is eliminated by cutting the flat cable, therefore, the cutting torque must be changed for each cable, which is hardly feasible.

With the diversification of modern vehicles, in particular, the rotary connector tends to use an increased number of circuits, and cutting the flat cable requires a very large torque. In consideration of the durability of the flat cable, therefore, it is not advisable to use a sharp cutting device. If the cutting device is a dull one, however, it cannot successfully cut the flat cable. Thus, it is delicate to adjust the cutting device to cutting work under a proper torque.

Further, the use of the cutting device or cutting edge in the rotary connector means an increase in the number of components of the connector, so that the space for the flat cable is reduced. In order to secure the same amount of rotation, therefore, the rotary connector itself is expected to be large-sized.

SUMMARY OF THE INVENTION

The object of the present invention is to provide a rotary connector capable of eliminating a hindrance to the rotation of a rotating member without using a cutting device despite the variation of the specifications of flat cables.

In order to achieve the above object, according to the present invention, there is provided a rotary connector which comprises a stationary case fixed to a stationary member, a rotating case combined with the stationary case for rotation relative to the stationary case, and the rotating case having a torque transmission section for transmitting a torque from a rotating member and a junction to be connected to an external wire. A flat cable housed, in the form of a spiral capable of tightening and loosening, in an annular space defined by the two cases, one end of the flat cable being connected at the junction to the external wire. The rotary connector is designed so that the torque transmission section and the junction are fractured and removed from the rotating case under first and second torques, respectively, transmitted from the rotating member.

The torque transmission section of the rotary connector comprises a key, pin or the like for receiving the rotary force of the rotating member and transmitting it to the rotating case. Accordingly, the torque transmission section is designed, in the aspect of the shape or material, so as to be fractured under the first torque. In general, the possible force of manual rotation of a steering wheel is about 12 N.m or less, so that the first torque is set at about 9 to 11 N.m.

In the rotary connector, moreover, the flat cable is connected at the junction to the external wire, which is connected to the rotating member. Even though the torque transmission section is fractured, therefore, the external wire and the flat cable connected thereto may prevent the rotating member from rotating smoothly. If the rotary connector is mounted in an automobile, for example, the junction may interfere with a spoke of the steering wheel, thereby hindering the rotation of the steering wheel.

Accordingly, the junction of the rotating case is also designed so as to fracture under the second torque which is different from the first torque. If a connecting post having snap fits or mounting flanges for attachment to the rotating case is used as the junction to be connected to the external wire, in this case, the snap fits or mounting flanges are designed, in the aspect of the shape or material, so as to be fractured under the second torque. This second torque is adjusted to about 6 to 9 N.m.

There are various types of rotary connectors in which the conductors of the flat cable and the external wire are connected at junctions by means of conventional electrical connecting terminals (wire terminals), or directly welded together, or electrically connected by resistance welding or ultrasonic welding using bus-bar terminals.

According to measurement results, necessary tensile forces on the external wire for the fracture of the conductors of the flat cable at the junctions, which are produced under the torque of the rotating member, are as follows.

It was indicated that a tensile force of about 10N per terminal is required for the case of the connection by means of the conventional electrical connecting terminals, about 50N per terminal for the case of the direct welding, and about 100N per terminal for the case of the connection by means of the busbar terminals or other auxiliary components which are notched.

Thus, the second torque is set at the aforesaid value if the rotary connector is based on the connecting method in which the flat cable and the external wire are connected by means of the electrical connecting terminals or the like.

In this case, moreover, if the junctions between the individual conductors of the flat cable and the external wire are arranged so as to be fractured in succession for each circuit, the torque of the rotating member can be restricted to a lower level than in the case where the junctions are fractured at the same time, so that the junctions can be fractured with ease. Thus, the junctions, which connect the conductors of the flat cable and the external wire, are arranged in the direction of a tangent to the rotation of the rotating case.

If the rotary connector, constructed in this manner, is mounted in a vehicle or the like without being oriented to the neutral position so that the rotating member is prevented from rotating smoothly, the torque transmission section of the rotating case is first fractured when the rotating member is compulsorily rotated under the first torque. When the rotating member is further rotated, the junctions connecting with the external wire are fractured under the second torque which is smaller than the first one. Thus, smooth rotation of the rotating member can be secured.

If the rotation of the rotating member is hindered, as is evident from the above description, such a hindrance can be easily eliminated by only manually rotating the rotating member with a strong force without using any cutting device, despite the variation of the specifications of the flat cable, and at the same time, electrical connection with external equipment can be cut off. Thus, an alarm may be given, taking advantage of this mechanism.

In the case of the rotary connector which uses a connecting post on the rotating case for the connection between the flat cable and the external wire, moreover, the connection can be established at a touch if the connecting terminals are arranged in the connecting post. This results in various effects, such as easier assembly of the rotary connector, low costs, etc.

The above and other objects, features, and advantages of the invention will be more apparent from the ensuing detailed description taken in connection with the accompanying drawings.

DETAILED DESCRIPTION

One embodiment of the present invention will now be described in detail with reference to the accompanying drawings of FIGS. 1 to 18.

Figure 1:
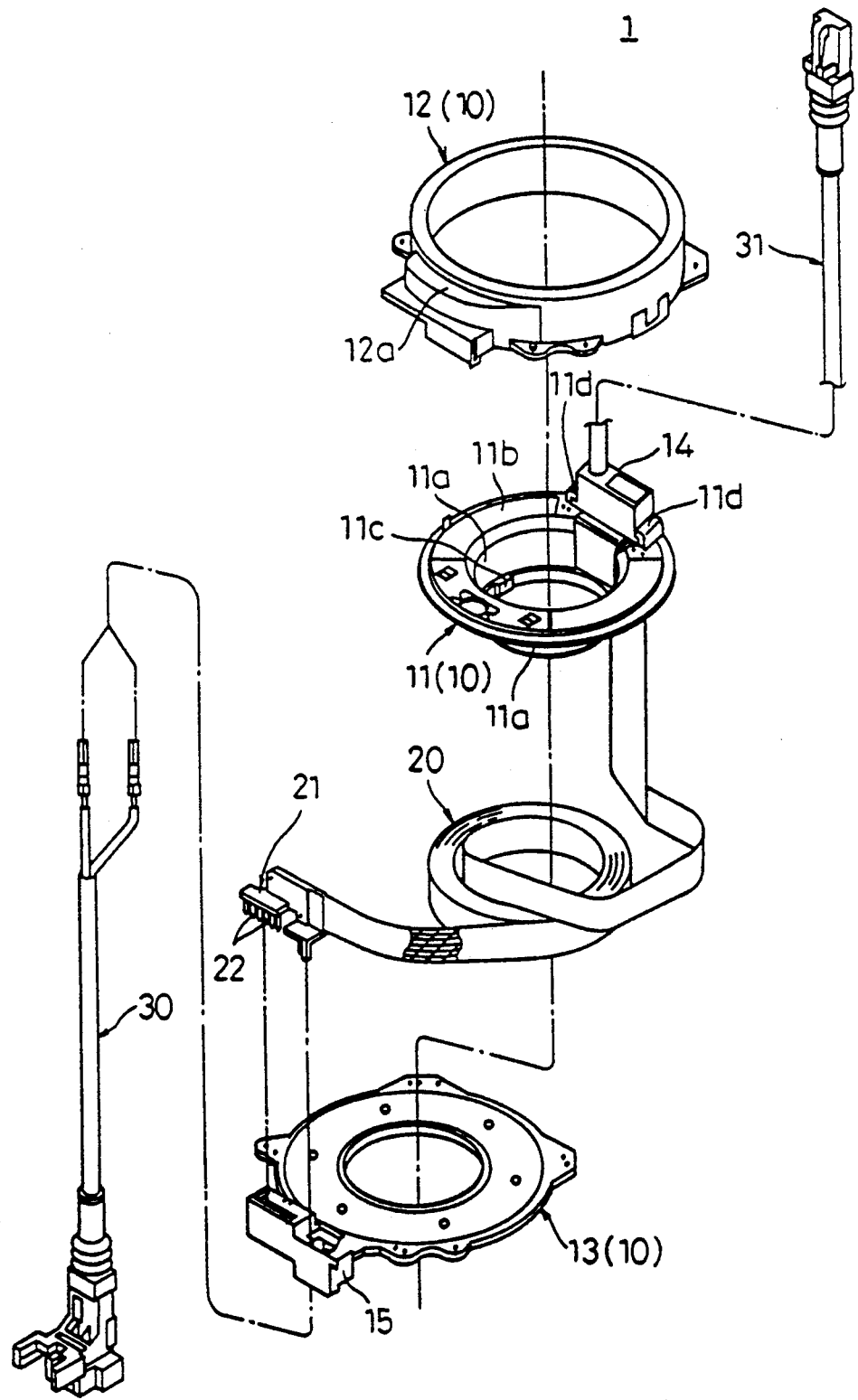
FIG. 1 is an exploded perspective view illustrating the way a rotary connector according to one embodiment of the present invention is assembled.

As shown in FIG. 1, a rotary connector 1 comprises a set of cases 10 and a flat cable 20 housed in the form of a spiral in the cases 10. The cases 10 are connected to external wires 30 and 31, individually.

The cases 10 include a rotating case 11, a stationary case 12 fixed to a stationary member and surrounding the rotating case 11 so as to hold it for rotation, and a base plate 13. When these cases 11 to 13 are put together, an annular space for the flat cable 20 is defined therein.

The rotating case 11 is formed having a flange portion 11b which extends radially outward from the upper portion of an inner cylinder shaft portion 11a, and a torque transmission key 11c is formed integrally on the inner peripheral surface of the shaft portion 11a. For example, a steering column is passed through the inner cylinder shaft portion 11a of the rotating case 11. Thus, the case 11 is rotated when it receives, through the key 11c, a torque which is produced as a steering shaft in the steering column rotates.

Figure 2:
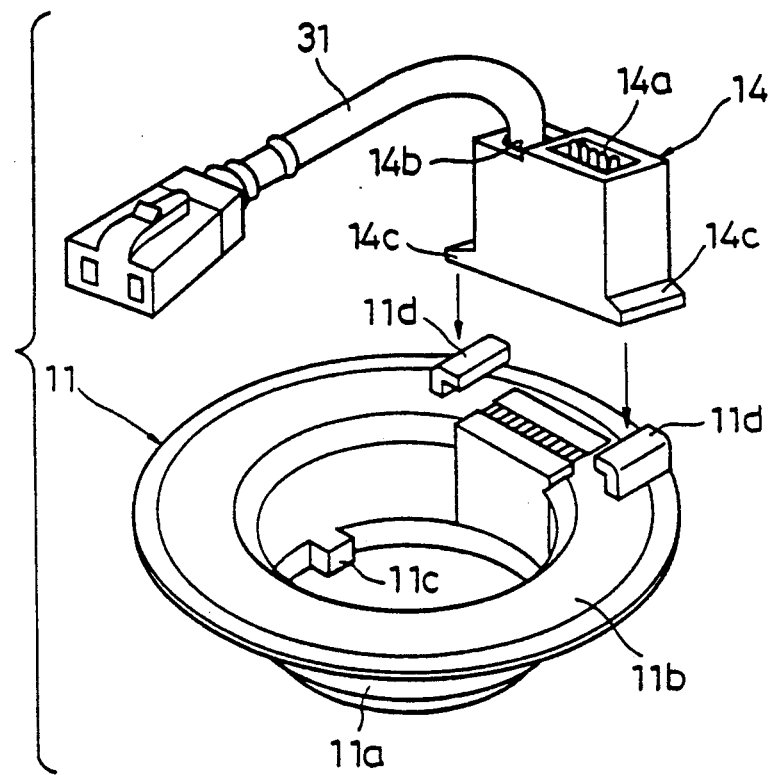
FIG. 2 is a perspective view showing a junction of the rotary connector.
Figure 4:
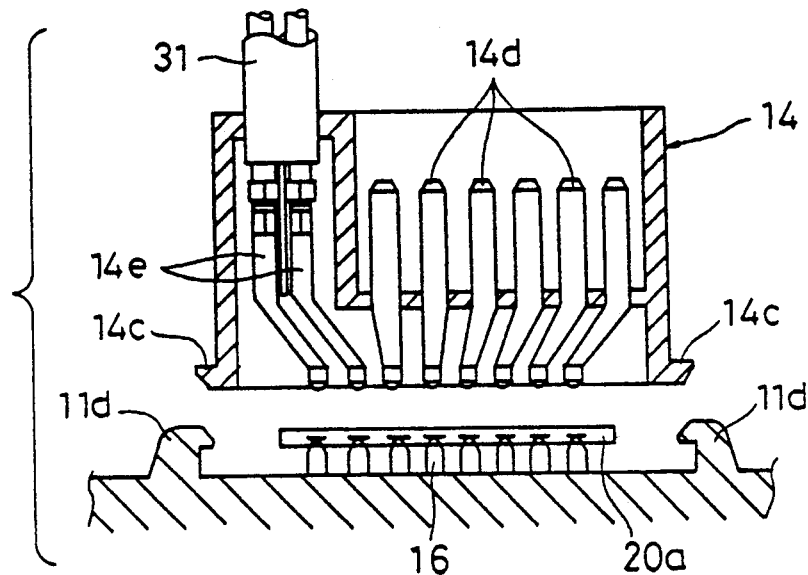
FIG. 4 is a sectional view taken along line IV—IV of FIG. 3.
Figure 5:
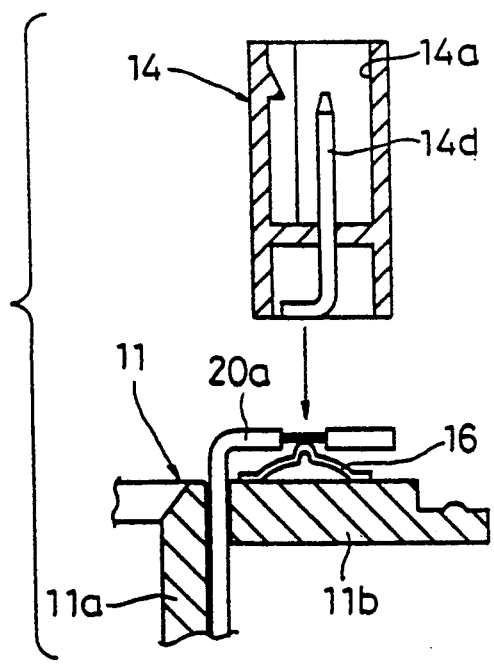
FIG. 5 is a sectional view taken along line V—V of FIG. 3.

The sectional area of a part or the whole of the torque transmission key 11c, with respect to the direction of fracture, is previously adjusted so that the key 11c can be fractured under a first torque (about 9 to 11 N.m) which is produced as the steering shaft is rotated by the operation of a steering wheel. In consideration of the fracture of the key 11c, a synthetic resin, such as polybutylene terephthalate or polyacetal, is used as the material of the rotating case 11. As shown in FIG. 2, a pair of mounting portions 11d are formed on the flange portion 11b. These mounting portions 11d are adapted to be fitted with a connecting post 14 (described later), which serves as a junction for connecting the external wire 31 and the flat cable 20. As shown in FIGS. 4 and 5, a bent inner end portion 20a of the flat cable 20 is located between the mounting portions 11d in a manner such that it is pressed toward the connecting post 14 by means of elastic members 16. For example, the mounting portions 11d are in the form of thin ridges such that they are fractured together with mounting flanges 14c of the connecting post 14 when subjected to a second torque of about 6 to 9 N.m, which is smaller than the first torque for the torque transmission key 11c.

As shown in FIG. 1, the stationary case 12 is combined with the base plate 13 in a manner such that the rotating case 11 is rotatably held between them. An attachment portion 12a protrudes radially outward from the flank or outer surface of the case 12. It is designed so as to be fitted with a joint mold 21 (mentioned later) of the flat cable 20 and fixed to a junction 15 of the base plate 13.

The base plate 13 is a disk-shaped plate which is formed having, on one side thereof, the junction 15 for connecting a external wire 30 to the joint mold 21.

The flat cable 20 includes a plurality of electrical conductors covered with an insulating material, and is loosely wound in spiral form in an annular space defined by the cases 11 to 13. The joint mold 21 is formed at the inner end of the flat cable 20. The flat cable 20 loosens or tightens as the rotating case 11 is rotated in accordance with the steering operation, and the rotary connector 1 permits a predetermined number of rotations of the rotating case 11 relative to the stationary case 12 and the base plate 13. A plurality of bus bars 22, which are connected individually to conductors, protrude from the joint mold 21.

Figure 3:
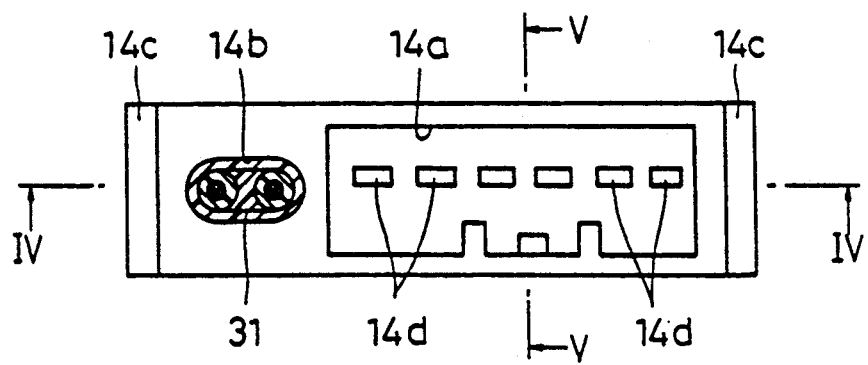
FIG. 3 is a plan view of a connecting post serving as the junction of the rotary connector.

As shown in FIGS. 2 and 3, the connecting post 14 includes a socket 14a and a fixing portion 14b, formed integrally with each other, and the mounting flanges 14c on the opposite sides of the bottom. The socket 14a is designed for connection with an electrical connector (not shown), and the fixing portion 14b serves to connect the external wire 31 one end of which is connected to the steering wheel side. The connecting post 14 is mounted on the rotating case 11 in a manner such that the mounting flanges 14c are in engagement with the mounting portions 11d, individually. As shown in FIGS. 3 to 5, a plurality of socket terminals 14d and wire terminals 14e (assembled terminals of the external wire 31) are arranged in the socket 14a or the fixing portion 14b of the connecting post 14. The mounting flanges 14c, like the mounting portions 11d of the rotating case 11, have a regulated thickness such that they are fractured when subjected to a torque of about 2 to 7 N.m. In consideration of this fracture of the flanges 14c, a synthetic resin, such as polybutylene terephthalate or polyacetal, is used as the material of the connecting post 14.

The rotary connector 1 according to the present invention is characterized in that the fracture strength of the torque transmission key 11c, the mounting portions 11d, and the mounting flanges 14c to resist the torque is set in the aforesaid manner.

Accordingly, if the rotary connector 1 is attached to a steering apparatus without being oriented to a neutral position with respect to horizontal rotation, the rotation may be hindered during the operation of the steering wheel. This hindrance can be avoided in the following manner.

When the flat cable 20 in the rotary connector 1 is wound up and tightened to its limit by the steering wheel operation, the steering wheel suddenly becomes heavy in the middle of the wheel operation. Recognizing this situation by the feeling of the wheel operation, at this time, a driver further rotates the steering wheel without delay.

Thereupon, the first torque (about 9 to 11 N.m), which is produced by the rotation of the steering shaft, first acts on the torque transmission key 11c of the rotating case 11, so that the key 11c is fractured and removed from the case 11. As a result, the engagement between the key 11c and the steering shaft, which prevents smooth rotation of the steering wheel, is removed, so that the steering wheel operation becomes lighter. Even though the steering shaft rotates, moreover, the rotating case 11 cannot be rotated.

If the steering wheel is further rotated, the rotating case 11 is pulled by the external wire 31, which is connected to the steering wheel side, through the connecting post 14, whereby it is rotated. As a result, the wheel operation becomes somewhat heavy, or the connecting post 14 interferes with a spoke of the steering wheel, thereby preventing the rotation of the wheel.

Figure 6:
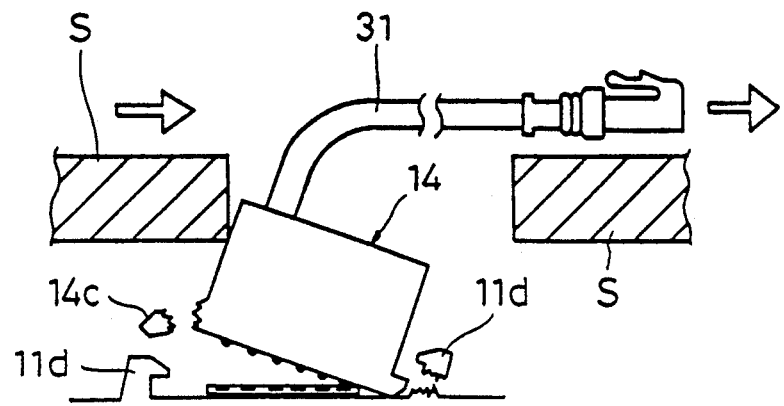
FIG. 6 is a front view, partially in section, illustrating the way the connecting post is fractured by interfering with a spoke of a steering wheel.

The mounting portions 11d and the mounting flanges 14c for mounting the connecting post 14 on the rotating case 11 are designed so as to be then fractured under the second torque of about 6 to 9 N.m. As shown in FIG. 6, therefore, the mounting portions 11d and the flanges 14c can be easily fractured under the second torque acting on the connecting post 14 which interferes with the spoke S rotating in the direction of the arrow.

Accordingly, the external wire 31 and the rotating case 11 are disconnected from each other, and all the causes of the hindrance to the steering wheel rotation are removed. Thus, the hindrance to the wheel rotation can be readily eliminated by manual operation.

Figure 7:
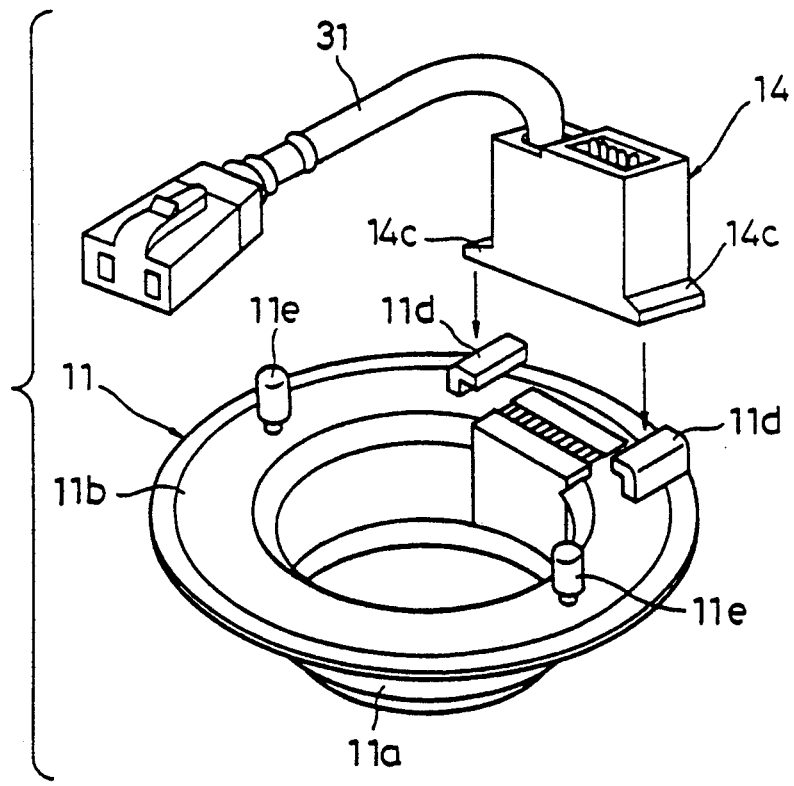
FIG. 7 is a perspective view showing a junction of the rotary connector including an alternative example of a torque transmission section.

In the arrangement described above, the torque transmission section comprises the torque transmission key 11c on the inner peripheral surface of the inner cylinder shaft portion 11a of the rotating case 11. Alternatively, however, the torque transmission means may be formed of torque transmission pins 11e set up on the flange portion 11b of the case 11, as shown in FIG. 7, for example. In this case, the pins 11e are designed so as to be fractured under the first torque of about 9 to 11 N.m which is produced by manual operation of the steering wheel.

Figure 8:
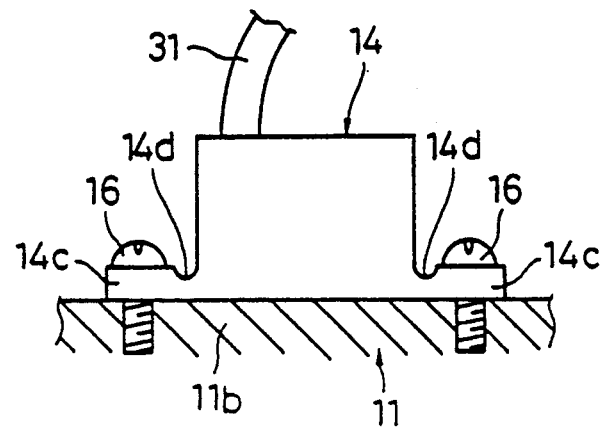
FIG. 8 is a front view, partially in section, showing a modification of the connecting post.

Further, the junction is not limited to the aforementioned arrangement, and may be arranged in the manner shown in FIG. 8. In this arrangement, the mounting flanges 14c of the connecting post 14 are provided with a thin-walled portion 14d each, and are fixed to the rotating case 11 by means of screws 16 or rivets (not shown), individually. The thickness of each thin-walled portion 14d is adjusted so that each flange 14c is fractured under the second torque of about 6 to 9 N.m.

Figure 9:
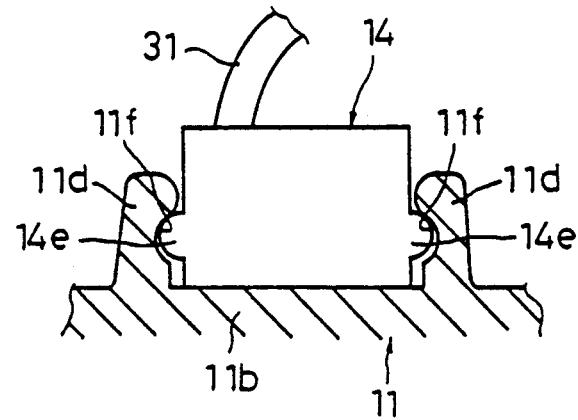
FIG. 9 is a front view, partially in section, showing another modification of the connecting post.

Also, the junction may be arranged in the manner shown in FIG. 9 with the same result. In this arrangement, the connecting post 14 is provided with connecting projections 14e, and the mounting portions 11d of the rotating case 11 are provided individually with engaging recess portions 11f which engage their corresponding projections 14e. The shape and thickness of each recess portion 11f are adjusted so that each mounting portion 11d is fractured under the second torque of about 6 to 9 N.m. In this case, the height of the connecting projections 14e may be adjusted so that the connecting post 14 can be disengaged from the mounting portions 11d when it is subjected to the aforesaid torque.

Figure 10:
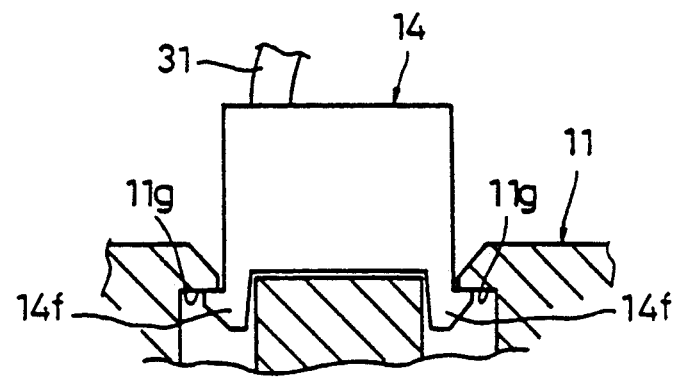
FIG. 10 is a front view, partially in section, showing still another modification of the connecting post.

Furthermore, the junction may be arranged in the manner shown in FIG. 10. In this arrangement, the connecting post 14 is provided with downwardly projecting snap fits 14f which can engage retaining holes 11g, individually, at the flange portion 11b of the rotating case 11. In this case, the shape of each snap fit 14f, e.g., the size of its hook, may be adjusted so that the fits 14f engaged with the retaining holes 11g can be fractured or drawn out of the holes 11g under the torque of about 6 to 9 N.m.

Figure 11:
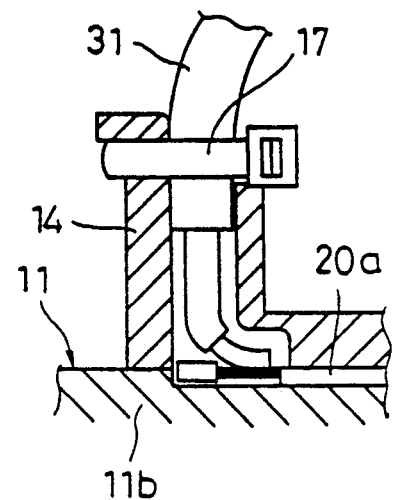
FIG. 11 is a sectional view showing means for fixing an external wire to the connecting post.
Figure 12:
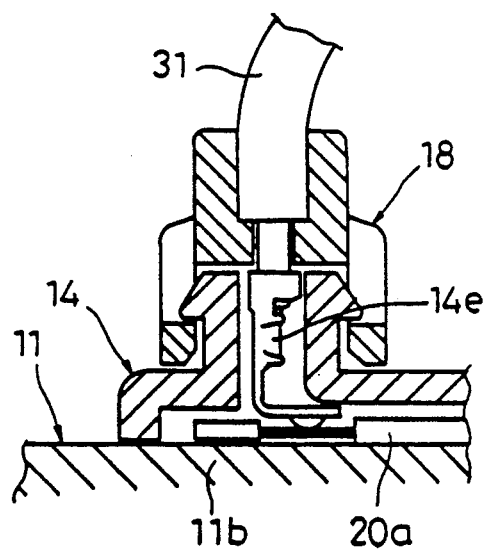
FIG. 12 is a sectional view showing another means for fixing the external wire to the connecting post.

The external wire 31 may be fixed to the connecting post 14 by means of a harness band 17, as shown in FIG. 11, for example. Alternatively, the wire 31 may be fixed to the post 14 by means of a cover 18 which is held on the post 14, as shown in FIG. 12. If the external wire 31 is fixed to the connecting post 14 in this manner, the fastening force of the harness band 17 or the cover 18 allows the wire 31 to be drawn out of the post 14 under the second torque of about 6 to 9 N.m.

Figure 13:
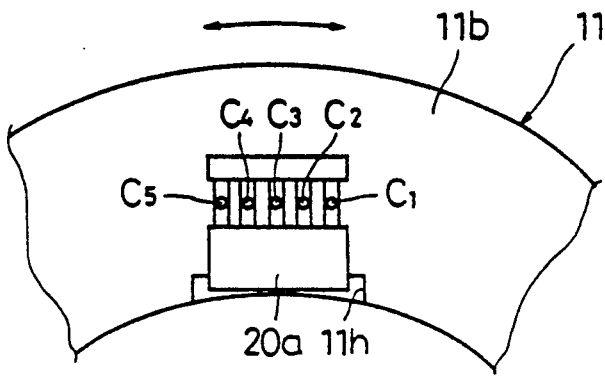
FIG. 13 is a plan view showing the principal part of a rotating case designed so that a flat cable and the external wire are directly connected by welding.
Figure 14:
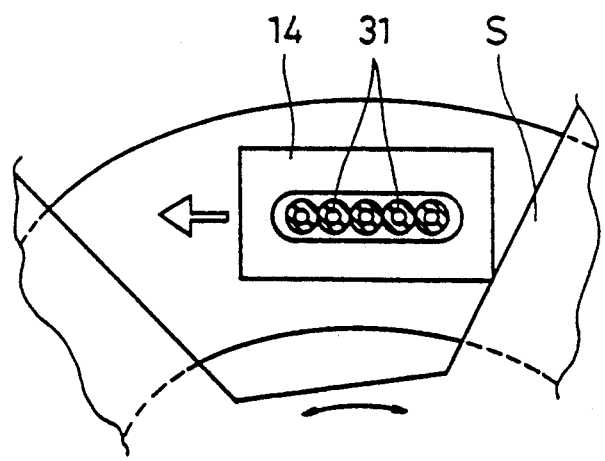
FIG. 14 is a top plan view showing the principal part of the rotating case of FIG. 13, in which the connecting post is fractured by a spoke of the steering wheel.

In connecting the flat cable 20 and the external wire 31, in the rotary connector 1, junctions C1 to C5 between the cable 20 and the wire 31 are arranged in the direction of a tangent to the rotating case 11, as shown in FIG. 13. According to this arrangement, if the connecting post 14 is fractured in the tangential direction by the spoke S of the steering wheel, as indicated by the arrow in FIG. 14, for example, the junctions C1 to C5 are successively subjected to a tensile force from the side of the external wire 31 which is connected to the steering wheel, and cannot be simultaneously subjected to the tensile force. Accordingly, the tensile force acts on the junctions C1 to C5 in succession without being dispersed, so that the junctions C1 to C5 can be fractured one after another by means of a small tensile force. In FIG. 13, numeral 11h denotes an opening in the flange portion 11b of the rotating case 11, through which the inner end portion 20a of the flat cable 20 can be drawn out of the case 11.

Figure 15:
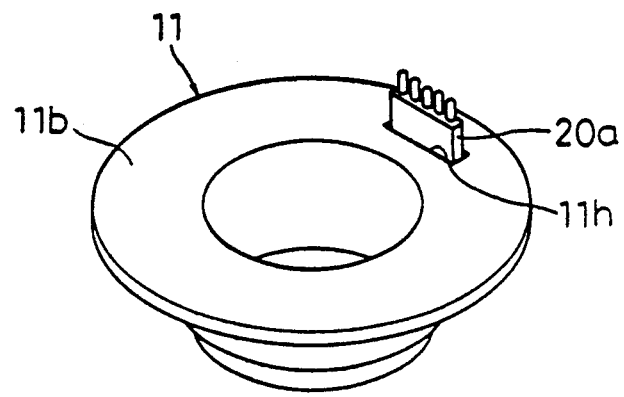
FIG. 15 is a perspective view showing an arrangement of the rotating case with respect to the inner end portion of the flat cable.
Figure 16:
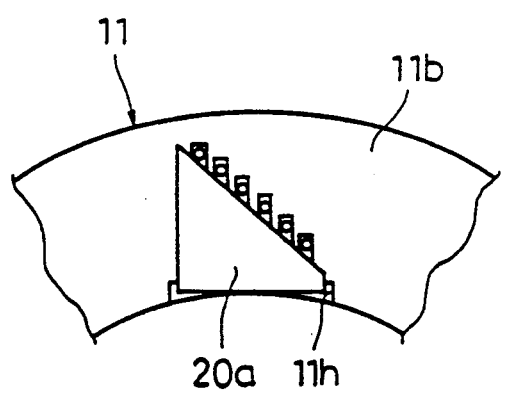
FIG. 16 is a plan view showing an arrangement of the principal part of the rotating case with respect to the inner end portion of the flat cable.

The rotary connector 1 may be also arranged in the manner shown in FIG. 15 with the same result. In this arrangement, the flange portion 11b of the rotating case 11 is provided with an opening 11h which extends parallel to a tangent to the case 11, and the inner end portion 20a of the flat cable 20 is drawn out through the opening 11h and connected to an external wire (not shown). The inner end portion 20a of the cable 20, which is drawn out upward through the opening 11h, may be cut aslant, as shown in FIG. 16, so that the end to be connected to the external wire is slanting, unless all the junctions are simultaneously subjected to the tensile force.

Figure 17:
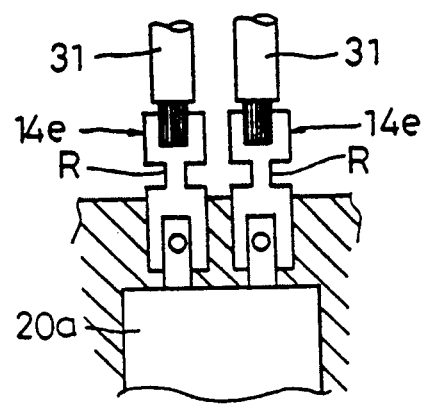
FIG. 17 is a sectional view illustrating the way the flat cable and the external wire are connected by means of notched wire terminals.
Figure 18:
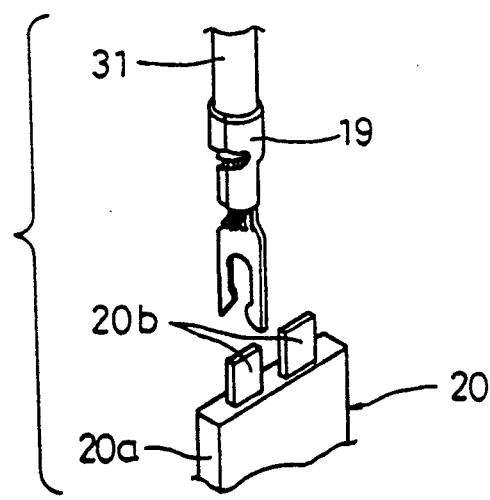
FIG. 18 is a perspective view illustrating the way the flat cable and the external wire are connected by means of press-fit connecting terminals.

In connecting the flat cable 20 and the external wire 31 across the wire terminals 14e by welding, moreover, each terminal 14e may be provided with a breakable notched portion R, as shown in FIG. 17, so that the junction between the cable 20 and the external wire 31 can be fractured under a torque of about 1 to 3 N.m. According to this arrangement, when the flat cable 20 shown in FIG. 1, which is provided with the joint mold 21 at each terminal for ease of assembly, is used in the rotary connector, the wire terminals 14e, which connect the cable 20 and the external wire 31 in the connecting post 14, are fractured, so that the wire 31 can be easily disengaged from the post 14. If the flat cable 20 and the external wire 31 are connected by means of pressfit terminals 19, which are adapted to be connected individually to conductors 20b projected from the inner end portion 20a of the cable 20 by press fitting, as shown in FIG. 18, the material and size of the terminals 19 are selected so that the terminals 19 can be disengaged by means of a tensile force of about 0.15 to 0.6N.

What is claimed is:

1. A cutter-less rotary connector comprising:
    a stationary case fixed to a stationary member;
    a rotating case coupled with the stationary case for rotation relative to the stationary case, an annular space being defined within a space enclosed by said stationary and rotating cases, the rotating case having a torque transmission section for transmitting a torque from a rotating member and a junction which is connectable to an external wire;
    a flexible flat cable having a plurality of electrical conductors coated for insulation and housed, in the form of a spiral capable of tightening and loosening, in said annular space, one end of the flat cable being connected at said junction to the external wire;
    said torque transmission section of said rotating case being fracturable and removable from said rotating case when a torque transmitted from the rotating member to said rotating case exceeds a given first torque value; and
    said junction being fracturable and removable from said rotating case upon application of a given second torque value to said junction, said first and second torque values being different from each other.

2. A rotary connector according to claim 1, wherein said torque transmission section comprises a torque transmission key engageable with the rotating member for transmitting the torque of the rotating member to said rotating case when engaged with the rotating member.

3. A rotary connector according to claim 2, wherein said torque transmission key is dimension so as to be fractured and removed from the rotating case when said torque applied thereto has said first torque value of 9 to 11 N.m.

4. A rotary connector according to claim 1, wherein said torque transmission section comprises a torque transmission pin engageable with the rotating member for transmitting the torque of the rotating member to said rotating case when engaged with the rotating member.

5. A rotary connector according to claim 4, wherein said torque transmission pin is dimension so as to be fractured and removed from said rotating case when the torque applied thereto has said first torque value of 9 to 11 N.m.

6. A rotary connector according to claim 1, wherein said junction comprises a cylindrical connecting post having mounting flanges adapted to be removably attached to mounting portions of said rotating case, said connecting post having terminals therein.

7. A rotary connector according to claim 6, wherein said mounting flanges of said connecting post are fracturable together with said mounting portions of said rotating case upon application of a torque having said second torque value of 6 to 9 N.m.

8. A rotary connector according to claim 7, wherein each of said mounting flanges of said connecting post has a thin-walled portion which is adapted to fracture upon application thereto of a given force.

9. A rotary connector according to claim 1, wherein said junction comprises a cylindrical connecting post having projections removably attached to mounting portions of said rotating case, said connecting post having terminals therein.

10. A rotary connector according to claim 9, wherein each of said mounting portions of said rotating case is provided with an engaging recess portion adapted to be fractured under application of a torque having said second torque value of 6 to 9 N.m transmitted from the rotating member to said cylindrical connecting post.

11. A rotary connector according to claim 1, wherein said junction comprises a cylindrical connecting post having elastic retaining hooks arranged to engage retaining holes in said rotating case formed in the rotating case, said connecting post having terminals therein.

12. A rotary connector according to claim 11, wherein said retaining hooks are drawn out of said retaining holes under application of a torque having said second torque value of 6 to 9 N.m transmitted from the rotating member to said cylindrical connecting post.

13. A rotary connector according to claim 11, wherein said retaining hooks are fractured under application of a torque having said second torque value of 6 to 9 N.m transmitted from the rotating member to said cylindrical connecting post.

14. A rotary connector according to claim 1, comprising fixing means for fixedly connecting said external wire to said junction.

15. A rotary connector according to claim 14, wherein said fixing means comprises band means for fastening the external wire to said junction.

16. A rotary connector according to claim 14, wherein said fixing means comprises a cover held on said junction to fix the external wire in a given position.

17. A rotary connector according to claim 1, wherein said junction is arranged in a tangential direction with respect to rotation of said rotating case.

18. A rotary connector according to claim 1, wherein said external wire includes a plurality of conductors; and respective electrical conductors of said external wire and of said flat cable are connected by welding by means of wire terminals, each wire terminal having a notched portion which is fracturable under application of said second torque value of 1 to 3 N.m to each of said notched portions.

19. A rotary connector according to claim 1, wherein said external wire includes a plurality of conductors; and respective electrical conductors of said external wire and said flat cable are attached to an end portion of the external wire and are connected by means of press-fit terminals, which terminals are connected individually to the electrical conductors of said flat cable by press fitting, and wherein said connections are successively releasable under application of said second torque value of 0.15 to 0.6 N.m to each of said terminals.

20. A rotary connector according to claim 1, wherein said second torque value is smaller than said first torque value.

* * * * *